United States Patent [19]
Fukuchi

[11] Patent Number: 5,403,990
[45] Date of Patent: Apr. 4, 1995

[54] APPARATUS BORING PERFORATIONS IN A WEB SHEET

[75] Inventor: Junichi Fukuchi, Tokyo, Japan

[73] Assignee: Japan Tobacco Inc., Tokyo, Japan

[21] Appl. No.: 58,253

[22] Filed: May 10, 1993

[51] Int. Cl.⁶ ............................................. B23K 26/00
[52] U.S. Cl. ............................ 219/121.7; 219/121.74; 219/121.75; 219/121.77
[58] Field of Search ........... 219/121.7, 121.71, 121.74, 219/121.75, 121.77; 131/281

[56] References Cited

U.S. PATENT DOCUMENTS

| | | |
|---|---|---|
| 4,767,909 | 8/1988 | Okumoto ........................ 219/121.7 |
| 4,860,773 | 8/1989 | Okumoto et al. .................... 131/281 |
| 4,916,272 | 4/1990 | Okumoto ........................ 219/121.7 |
| 5,210,390 | 5/1993 | Okumoto ........................ 219/121.7 |

FOREIGN PATENT DOCUMENTS

| | | |
|---|---|---|
| 57-26872 | 6/1982 | Japan . |
| 57-37437 | 8/1982 | Japan . |
| 57-49318 | 10/1982 | Japan . |
| 59-318 | 1/1984 | Japan . |
| 59-21380 | 2/1984 | Japan . |
| 59-42194 | 3/1984 | Japan . |
| 59-78067 | 5/1984 | Japan . |
| 61-23591 | 2/1986 | Japan . |
| 62-89593 | 4/1987 | Japan . |
| 157787 | 6/1989 | Japan . |

*Primary Examiner*—C. L. Albritton

[57] ABSTRACT

A rotating polygon mirror deflects a continuous laser beam, applying the deflected beam to a beam-splitting mirror through a focusing lens 6 which functions as an $f\theta$ lens. The beam is applied to the two reflective surfaces of the mirror alternately. As a result, the mirror splits the beam into two beams, which are applied to two beam-splitting mirrors, respectively. The mirrors split the input beams, each into two segment beams. The four segment beams are focused by four lenses onto the surface of a web sheet, thereby forming beam spots. The beam spots move in the same direction and at the same speed as the web sheet, thus scanning limited surface regions of the sheet. As a result, rows of perforations, each being a truly circular hole, are formed in the web sheet.

11 Claims, 4 Drawing Sheets

APPARATUS BORING PERFORATIONS IN A WEB SHEET

BACKGROUND OF THE INVENTION

1. Field of the Invention

The present invention relates to an apparatus for boring perforations in a web sheet such as a tipping paper sheet, and more particularly, to an apparatus which can bore in a web sheet perforations of a uniform shape at high speed.

2. Description of the Related Art

Various apparatuses are known which bore perforations in a rolled paper sheet or a web sheet such as a tipping paper sheet. In these apparatuses, a pulsating laser beam is used to form a number of perforations having a uniform shape and an accurate pattern in a rolled paper sheet or a web sheet such as a tipping paper sheet. Various methods are available for converting a laser beam into a pulsative one. Among them are: (1) pulse beam oscillation method; (2) slit method; (3) chopper method, (4) shutter method, i.e., beam scanning method, and high-speed polygon mirror method.

In the pulse beam oscillator method, a carbon dioxide gas laser, which generates a pulsating laser beam, is usually employed as a laser beam source. This is because the pulsating laser beam generates a wavelength of 10 μm which can be optimally absorbed into the water contained in a web sheet. At present, the carbon dioxide gas laser is considered to be more suited for boring perforations in paper than any other type of a laser hitherto developed. This laser, however, requires hundreds of microseconds to increase the beam energy from the zero level to the highest level and decrease it back to the zero level. Consequently, the laser cannot generate beam pulses at sufficiently short time intervals. Hence, there are limits to the speed at which a boring apparatus incorporating the carbon dioxide gas laser can bore perforations in a web sheet. More specifically, the maximum speed is no more than 2 mm/sec for perforations arranged at a pitch of 1 mm, and the boring efficiency is relatively low.

In the slit method, a slit member having a row of slits is moved, along with a paper sheet located below the slit member, while a continuous laser beam converged by a lens system is applied to the slit member. As a result, beams are applied through the slits onto the paper sheet, thereby forming perforations in the paper sheet. Since it suffices for the laser to emit a continuous beam, not a pulsative beam as in the pulse beam oscillation method, perforations can be formed in the paper sheet at a higher speed, e.g., 6 mm/sec, and hence, at a lower cost than in the case where the pulse beam method is employed. The slit method, however, is disadvantageous in the following respects:

(a) Since the slits can hardly be formed with so high an accuracy as to have the same size, the perforations formed by using the slit inevitably vary in size and pitch. In this respect the slit method is generally inferior to the pulse beam oscillation method.

(b) The slits are located substantially at the focal point of the lens system, and the beam converged by the lens system is continuously applied to the slit member. The converged beam, which is intense, may damage the slit member, and the slits may thereby vary in size, giving rise to variations in the size of and pitch of perforations.

(c) The laser beam may burn the paper sheet in the process of perforating the sheet, forming ashes on the sheet. The ashes may adhere to the slit member, narrowing the slits and eventually hindering the passage of the beam through each slit. If this happens, the resultant perforations in the paper sheet will vary in size.

In the chopper method, a continuous laser beam is applied to a rotating chopper disk, which chops the beam into segment beams. The segment beams are sequentially applied onto a paper sheet, whereby perforations are formed one after another in the sheet and located at regular intervals. The chopper method is free of the problems inherent in the pulse beam oscillation method and the slit method. However, the chopper disk must be rotated at high speed, and may be broken while rotating at high speed, due to centrifugal force. In the case of a chopper disk having a diameter of 30 cm and capable of chopping the beam 20 times per rotation, it forms only 20,000 segment beams every minute when rotated at 1,000 rpm, and forms as many as 1,200,200 segment beams when rotated at 60,000 rpm. If the disk is rotated at so high a speed as 60,000 rpm, it is quite probably that the disk will be broken.

In the shutter method, a continuous laser beam is directed to a plurality of rotating disks, each having reflective surfaces and openings, as is disclosed in Published Examined Japanese Patent Applications 57-37437, 57-49318, and 59-318. As the beam is reflected by reflective surfaces and output through the holes, it is divided into segment beams. The segment beams are applied onto a paper sheet, thus perforating the sheet. The shutter method can form rows of perforations in the sheet at the same time. This means effective use of laser power, which results in a high-efficiency perforating process. The same number of rotating disks as the number of rows of perforations must be used, however. Moreover, the disks must be made with a very high precision. Otherwise, the disks will fail to rotate at a constant speed, giving rise to a perforation inaccuracy, and will be broken in the worst case. To have many reflective surfaces and many openings, each disk needs to have a large diameter. It would therefore be difficult to machine the disk with a high precision. This may also invite destruction of the disk.

The high-speed polygon mirror method is disclosed in Published Unexamined Japanese Patent Application 3-40191. This method uses a polygon mirror and a plurality of mirrors. A continuous laser beam is applied to the polygon mirror which is rotating at high speed, and deflected thereby, thus the beam is chopped into segment beams. The segment beams are applied to the mirrors, which reflect the segment beams to a plurality of lenses, respectively. The lenses converge the segment beams. The segment beams are sequentially applied onto a paper sheet, whereby the sheet is perforated. Since all laser power generated by the laser is utilized exclusively for perforating the sheet, the energy-efficiency is high in the high-speed polygon mirror method. Further, because the method helps form rows of perforations at the same time, the perforation efficiency can increase. Since the polygon mirror has a smaller diameter than the disks used in the chopper method and the shutter method, it can be made with high precision and can, therefore, be rotated at a high constant speed and eventually serves to perforate the sheet with high precision. More specifically, a polygon mirror having a diameter of about 40 mm, can be rotated at so high a speed as 120,000 rpm so that perforations can be formed in the paper sheet at a pitch of 0.5 mm and at a speed of 24 m/sec.

In the pulse beam oscillation method, the laser emits beams intermittenly, and its beam-emitting efficiency is inevitably low. In the slit method and the shutter method, the continuous laser beam is repeatedly shielded by the slit member or the chopper disk so frequently that its energy is not effectively utilized. In the shutter method, the disks must be rotated at a speed sufficiently high to perforate the paper sheet at high speed, and may be broken when rotated so fast. The problems of these methods are not found with the high-speed polygon mirror method, which can form perforations of a uniform shape in a paper sheet at a sufficiently high speed. The high-speed polygon mirror method is, however, disadvantageous. Since the segment beams generated by deflecting the laser beam by the rotating polygon mirror are reflected by the mirrors and applied to the lenses, the lenses may focus the segment beams at different positions, forming beam spots of different sizes, because they differ in aberration. In other words, the lenses do no have the same focal distance. Consequently, the perforations formed in the paper sheet by applying the segment beams focused by the lenses may have different sizes. In the worst case, some of the lenses fail to converge the input pulses into beams slender enough to form perforations in the sheet, and the sheet will have regions perforated as desired and regions not perforated at all.

As indicated above, the boring apparatuses employing the existing methods of converting a laser beam into a pulsative one cannot perforate a paper sheet at high speed, cannot form perforations of a uniform size, cannot utilize the laser-beam energy efficiently, or may be damaged if the disk or disks used have not been machined with high precision.

SUMMARY OF THE INVENTION

Accordingly, the object of the present invention is to provide a boring apparatus which can form tiny perforations in a web sheet, with high accuracy, at high speed, and with high reliability.

According to the invention, there is provided a boring apparatus which comprises:
- a laser beam source for generating a continuous laser beam;
- a first converging lens for converging the laser beam generated by the laser beam source;
- a rotary polygon mirror for deflecting the laser beam converged by the first converging lens;
- a beam splitting/reflecting mirror for splitting the laser beam deflected by the rotary polygon mirror, into segment beams and reflecting the segment beams;
- a converging-lens system for converging the segment beams applied from the beam splitting/reflecting mirror, on the surface of a web sheet; and
- a second converging lens located between the rotary polygon mirror and the beam splitting/reflecting mirror, for converging the segment beams and applying the converted segment beams at a constant speed to a limited surface region of the web sheet.

With the boring apparatus of the invention it is possible to generate a continuous laser beam, whereby the segment beams of constant energy are applied onto the web sheet, forming perforations of a uniform size in the web sheet. In addition, since the polygon mirror and the beam splitting/reflecting mirror cooperate, reflecting the laser beam and splitting the same into segment beams, the energy of the laser beam is not wasted so that the apparatus is efficiency in terms of energy saving. Further, since the apparatus can form a plurality of rows of perforations in a web sheet at the same time, its operating efficiency is high. Still further, since the spot any segment beam forms on the web sheet moves at the same speed and in the same direction as the web sheet and hence remains stationary relative to the web sheet during the sheet-perforating process, it can form in the sheet a truly circular hole having a precise and accurate diameter. Obviously, less energy is required to make a circular hole in the web sheet than to form an elongated hole having a minor axis equal to the diameter of the circular hole. In view of this, too, the boring apparatus of this invention is energy-efficient.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention and, together with the general description given above and the detailed description of the preferred embodiment given below, serve to explain the principles of the invention.

DETAILED DESCRIPTION OF THE PREFERRED EMBODIMENT

A boring apparatus, which is an embodiment of the present invention, will be described with reference to the accompanying drawings.

Figure 1:
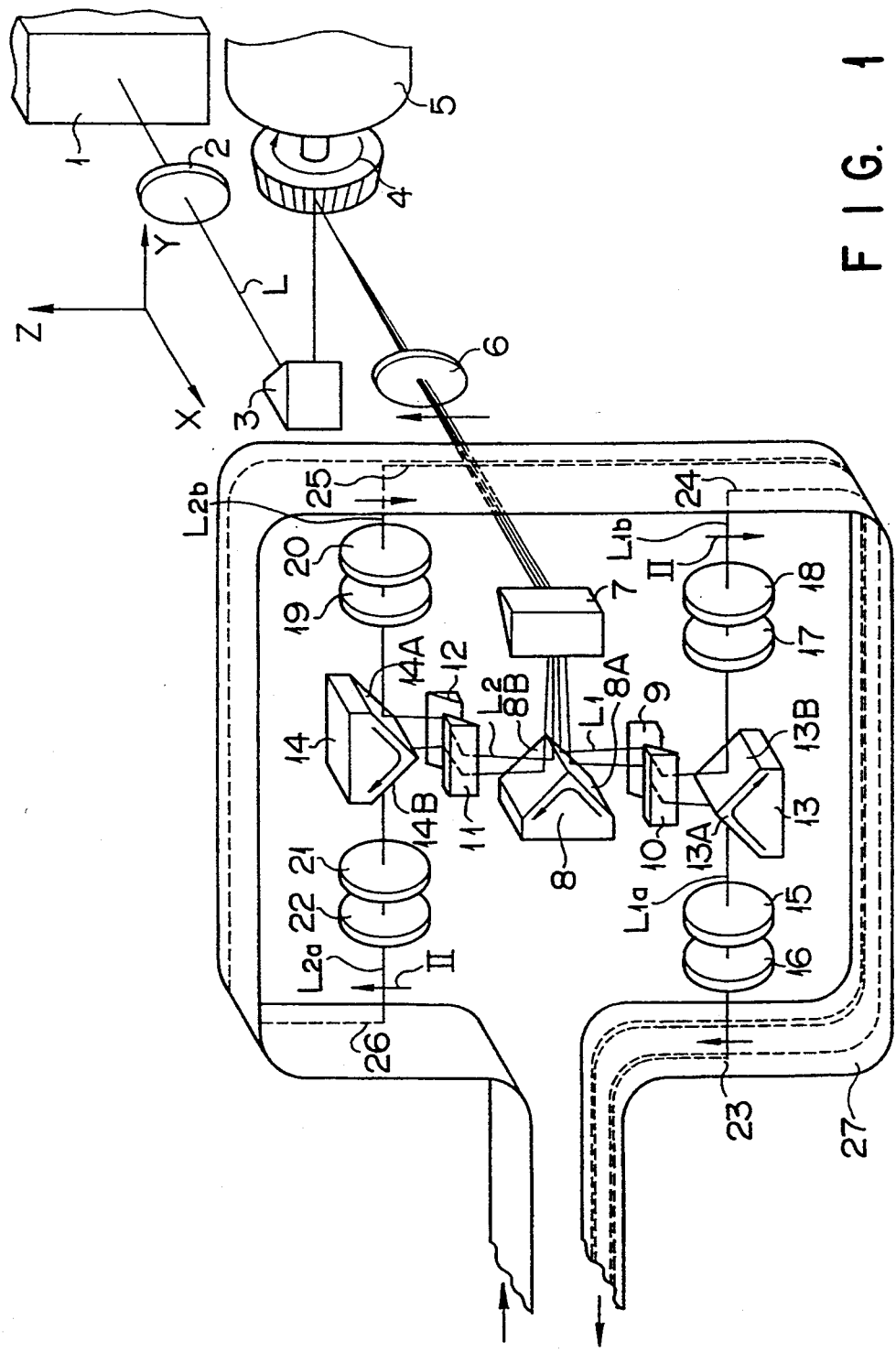
FIG. 1 is a perspective view schematically showing a boring apparatus according to the present invention.

As shown in FIG. 1, a laser 1 emits a continuous laser beam L in a direction X to a focusing lens 2. The lens 2 converges the beam L and applies the same to a mirror 3, which reflects the beam L by 90° and applies the beam in a direction Y to a rotating polygon mirror 4 driven by a high-speed, air-spindle motor 5.

Figures 2A, 2B:
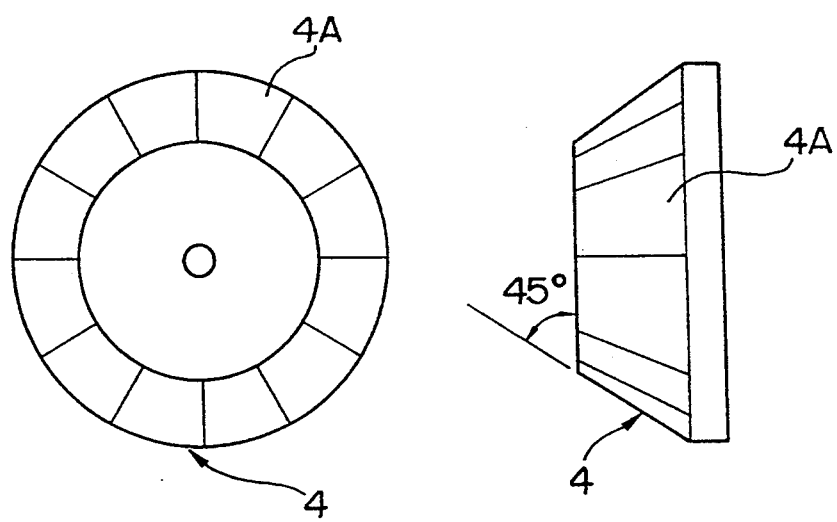
FIGS. 2A and 2B are a plan view and a side view, both showing a rotary polygon mirror incorporated in the boring apparatus of FIG. 1.

As is best shown in FIGS. 2A and 2B, the polygon mirror 4 is generally a truncated cone. It has a predetermined number of reflective surfaces 4A on its circumference. As FIG. 2B shows, each of the reflective surfaces 4A is inclined at about 45° to the axis of the polygon mirror 4. Referring back to FIG. 1, the mirror 4 is connected to the shaft of the high-speed spindle motor 5.

The laser beam L reflected and, hence, deflected, by any one of the reflective surfaces 4A is applied to a focusing lens 6. The lens 6 is an fθ lens; it restricts the deflection angle of the laser beam L and outputs a beam whose diameter remains unchanged even if the deflection angle of the input beam varies. The laser beam L output from the focusing lens 6 is reflected by a reflection mirror 7. The mirror 7 reflects the beam L to a first beam-splitting mirror 8. The mirror 8 splits the input beam L into two beams L1 and L2. The deflection angle of the laser beam L, i.e., the deflection range thereof, is determined by the number of the reflective surfaces 4A of the polygon mirror 4 and the convergence characteristic of the focusing lens 6.

The first beam-splitting mirror 8 is held by a movable support (not shown) and can, therefore, be moved slightly in a direction Z to have its position adjusted. The mirror 8 is generally a triangular prism whose vertex is directed toward the reflection mirror 7 as is shown in FIG. 1. Two sides of the mirror 8 which meet at the vertex function as reflective surfaces 8A and 8B. While the beam L is deflected to the deflective surface 8A, it is applied as beam L1 to a mirror 9. While the beam L is deflected to the deflective surface 8B, it is applied as beam L2 to a mirror 11. Hence, as the laser beam L is repeated deflected this way, it is alternately applied to the mirrors 9 and 11. In other words, the first beam-splitting mirror 8 splits the laser beam L into the beams L1 and L2.

The first laser beam L1 is applied from the mirror 9 to a mirror 10 and reflected thereby to a second beam-splitting mirror 13. Similarly, the second laser beam L2 is applied from the mirror 11 to a mirror 12 and reflected thereby to a third beam-splitting mirror 14. Like the first beam-splitting mirror 8, the mirrors 13 and 14 are triangular prisms, having a pair of reflective surfaces 13A and 13B and a pair of reflective surfaces 14A and 14B, respectively. The beam-splitting mirrors 13 and 14 are held by movable supports (not shown) and can be slightly moved to have its position adjusted in the direction Y.

The laser beam L1 reflected from the reflective surface 8A of the first beam-splitting mirror 8 is reflected by the mirror 9 and then by the mirror 10 and is subsequently applied to the reflective surfaces 13A and 13B of the second beam-splitting mirror 13. While the beam L1 is deflected to the reflective surface 13A, it is applied as a segment beam L1a to a first focusing system comprising lenses 15 and 16. While the beam L1 is deflected to the reflective surface 13B, it is applied as a segment beams L1b to a second focusing system comprising lenses 17 and 18. Thus, the mirror 13 splits the the beam L1 into two segment beams L1a and L1b.

Meanwhile, the laser beam L2 reflected from the reflective surface 8B of the first beam-splitting mirror 8 is reflected by the mirror 11 and then by the mirror 10 and is subsequently applied to the reflective surfaces 14A and 14B of the third beam-splitting mirror 14. While the beam L2 is deflected to the reflective surface 14, it is applied as a segment beam L2a to a third focusing system comprising lenses 19 and 20. While the beam L2 is deflected to the reflective surface 14B, it is applied as a segment beams L2b to a fourth focusing system comprising lenses 21 and 22. Thus, the mirror 14 splits the the beam L2 into two segment beams L2a and L2b.

Thus, the polygon mirror 4 deflects the laser beam L emitted from the laser 1, sequentially applying the same to beams to the first beam-splitting mirror 8 via the focusing lens 6 and the reflection mirror 7. The beam-splitting mirrors 8, 13, and 14 split every beam applied reflected by the mirror 7, into four segment beams L1a, L1b, L2a, and L2b. The four segment beams are applied to four focusing systems which comprise the focusing lenses 15 and 16, the focusing lenses 17 and 18, the focusing lenses 19 an 20, and the focusing lenses 21 and 22, respectively.

The segment beams L1a, L1b, L2a, and L2b, which are slightly diverging beams, are applied to the focusing lenses 15, 17, 19, and 21, respectively. The lenses 15, 17, 19, and 21 convert the diverging beams to parallel beams, which are applied to the focusing lenses 16, 18, 20, and 22. The lenses 16, 18, 20, and 22 converge the parallel beams at their focal points existing in the surface of a web sheet 27 being fed along a circulating path which is indicated by arrows II and which extends around the optical system constituted by the components 8 to 22. Therefore, the converged beams L1a, L1b, L2a, and L2b form intense beam spots on the surface of the web sheet 27, whereby perforations 23, 24, 25, and 26 are formed in the web sheet 27.

Since the segment beams L1a, L1b, L2a, and L2b have been obtained by splitting the beam L which is deflected by the polygon mirror 4, they scan the surface of the web sheet 27 in the same direction as the polygon mirror 4 deflects the beam L. The web sheet 27 is fed in the same direction and substantially at the same speed as the segment beams L1a, L1b, L2a, and L2b scan the web sheet 27. Stated in another way, the angle at which the focusing lens 6 deflects the laser beam L define the surface region of the sheet 27 which can be scanned with the beams L1a. The lens 6 deflects the beam L at such a speed that the segment beams L1a, L1b, L2a, and L2b scan the web sheet 27 at substantially the same speed as the web sheet 27 is fed in the direction of the arrow II. Hence, the beam spots formed by the segment beams remain stationary relative to the sheet 27.

Since the segment beams L1a, L1b, L2a, and L2b are deflected, scanning the web sheet 27, they have aberration, and the points where they are focused inevitably move perpendicularly to the sheet-feeding direction. The speed of the sheet 27 and the distances between the sheet 27 and the lenses 16, 18, 20, and 22 are of such values that the beams L1a, L1b, L2a, and L2b trace their focusing points and that these points are spaced from the lenses 16, 18, 20, and 22 by the same distance. Hence, the spots the beams L1a, L1b, L2a, and L2b form on the surface of the web sheet 27 are located at the focusing points of the beams L1a, L1b, L2a, and L2b, despite the focusing points move perpendicularly to the sheet-feeding direction. As a result, the smallest possible beam spots are always formed on the surface of the web sheet 27.

The focusing lenses 15 to 22 faces the web sheet 27 and are so located that their optical axes intersect the sheet 27 at points spaced apart in the widthwise direction of the web sheet 27. Hence, the segment beam L1a focused by the lenses 15 and 16 form a first row of perforations in the sheet 27; the segment beam L1b focused by the lenses 17 and 18 form a second row of perforations; the segment beam L2b focused by the lenses 19 and 20 form a third row of perforations; and the segment beam L2b focused by the lenses 21 and 22 form the fourth row of perforations. The four rows of perforations thus formed are parallel to one another, and every perforation formed in the web sheet 27 is truly circular.

Figure 3:
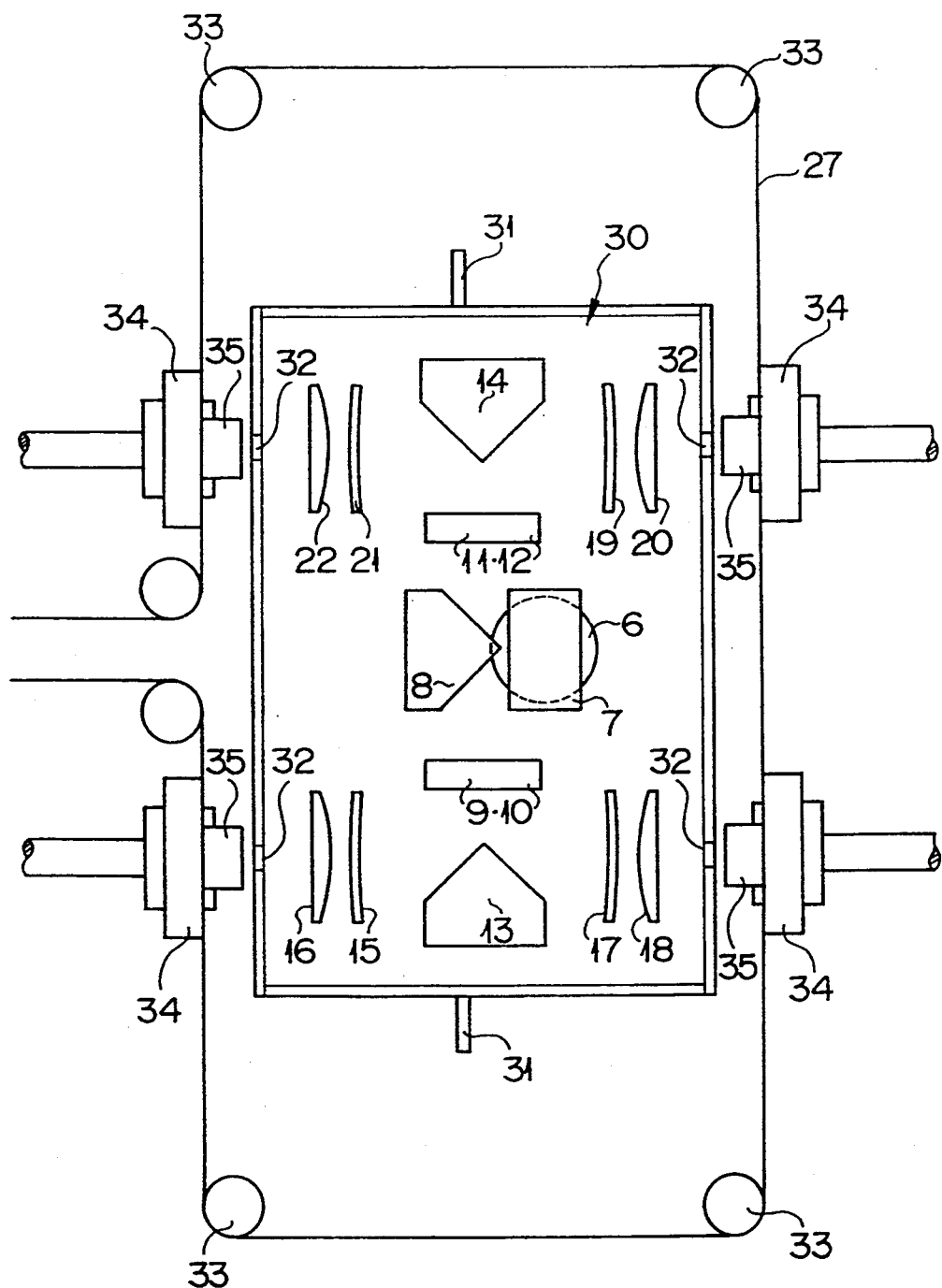
FIG. 3 is a plan view illustrating the boring apparatus in greater detail than FIG. 1.

FIG. 3 shows the boring apparatus of FIG. 1, in greater detail. As can be understood from FIG. 3, the optical system is contained in the sealed housing 30. The housing 30 is connected by a hose 31 through which compressed air is supplied from a compressor (not shown) into the housing 30. The housing 30 has four elongated holes 32 which extend along the path for the web sheet 27, and which allow the passage of the segment beams L1a, L1b, L2a, and L2b output from the focusing lenses 16, 18, 20, and 22, respectively. Four rollers 33 are arranged around the housing 30. The web sheet 27 is wrapped around these rollers 33 and is fed at a constant speed as the rollers 33 are rotated by a drive mechanism (not shown). Two sheet-attracting devices 35 are arranged between the adjacent two rollers 33, and two sheet-attracting devices 33 between the other two rollers 33. Each device 33 is connected to a vacuum pump (not shown) and has a sheet-attracting surface which opposes the corresponding elongated holes 32 of the housing 30. Four beam guides 35, which are hollow members, are arranged around the housing 30, each located between the housing 30 and one sheet-attracting device 34. Each sheet-attracting device 34 has a suction hole opening at its sheet-attracting surface. The suction hole has a cross section covering that surface region of the web sheet 27 which is scanned by the segment beam passing through the elongated hole 32 and the beam guide 35.

In operation, compressed air is introduced into the housing 30, increasing the pressure in the housing 30. The rollers 33 are driven, feeding the web sheet 27 at a constant speed. The vacuum pump connected to the sheet-attracting devices 34 is driven, whereby each device 34 attracts a portion of the sheet 27 onto its sheet-attracting surface. That portion of the sheet 27 is thereby stretched flat and straight. Since the pressure in the housing 30 is higher than the pressure outside the housing 30, air flows from the housing 30 through the elongated holes 32, allowing no dust to enter the housing 30. The optical system placed within the housing 30 is thereby kept clean. The air flows into the beam guides 35, raising the pressure in the guides 35. This helps the sheet-attracting devices 34 to attract the sheet 27 more readily. Hence, that portion of the web sheet 27 which is attracted to any sheet-attracting device 34 become more flat.

Further, since the sheet-attracting devices 34 are evacuated by means of the vacuum pump (not shown), the ashes formed as the segment beams L1a, L1b, L2a, and L2b are applied to the sheet 27, thus perforating the sheet 27, are drawn out of the devices 34. The ashes will not remain on the web sheet 27, and the sheet-attracting devices 34 remain clean.

In the optical system shown in FIGS. 1 and 3, the laser beam L is split into four segment beams, and four rows of perforations are simultaneously formed in the web sheet. According to the present invention, the beam L may be split into more or less segment beams, thereby to form more or less rows of perforations in the sheet at the same time.

Figure 4:
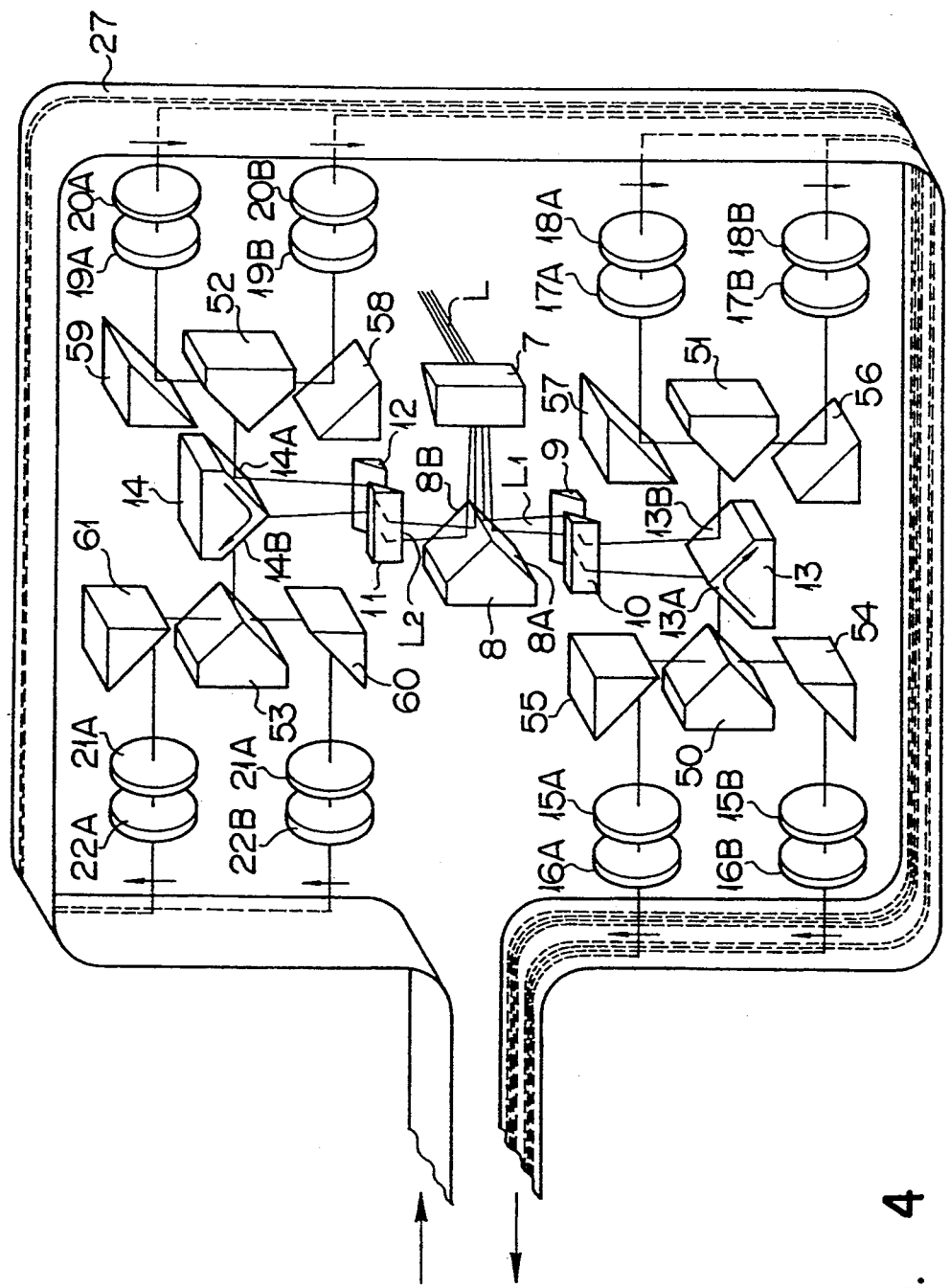
FIG. 4 is a perspective view schematically showing the optical system of a modification of the boring apparatus shown in FIG. 1.

FIG. 4 illustrates the optical system of a modification of the boring apparatus shown in FIGS. 1 and 3, which system is designed to split a continuous laser beam into eight segment beams so that eight rows of perforations may be formed in a web sheet. This optical system will be described, with reference to FIG. 4.

The optical system of FIG. 4 is similar to the optical system shown in FIGS. 1 and 3 in terms of operating principles. Hence, the components similar to or identical with those shown in FIGS. 1 and 3 will be denoted by the same numerals and will not be described in detail.

As is shown in FIG. 4, the two beams supplied from the beam-splitting mirror 13 are split by beam-splitting mirrors 50 and 51, each into two segment beams, and the two beams supplied from the beam-splitting mirror 14 are split by beam-splitting mirrors 52 and 53, each into two segment beams. As a result of this, eight segment beams are obtained. The eight segment beams are reflected by eight mirrors 54 to 61, respectively, and subsequently applied to eight focusing systems which comprises a pair of lenses 15A and 16A, a pair of lenses 15B and 16B, a pair of lenses 17A and 18a, a pair of lenses 17B and 18B, a pair of lenses 19A and 20A, a pair of lenses 19B and 20B, a pair of lenses 21A and 22A, and a pair of lenses 21B and 22B, respectively. The segment beams focused and output by the lenses 16A, 16B, 18A, 18B, 20A, 20B, 22A, and 22B are applied to a web sheet 27, thereby forming eight rows of perforations in the sheet 27 as the sheet is fed in the direction of the shown arrows in FIG. 4.

The boring apparatus described above was actually manufactured and operated for testing purpose. The apparatus was found to form perforations at the speed of 20 m/sec, each perforation being a circular one having a diameter of 0.1 mm.

As indicated above, the boring apparatus of the present invention uses a continuous laser beam. Since the continuous laser beam has stable power, the perforations the apparatus forms in a web sheet can be substantially uniform in both size and shape. The continuous laser beam is split or chopped into segment beams by means of the polygon mirror and the beam-splitting mirrors, without wasting the energy of the laser beam. In other words, the whole energy of the laser beam is utilized to perforate a web sheet. The boring apparatus is, therefore, energy-efficient. Further, since the boring apparatus simultaneously forms a plurality of rows of perforations in a web sheet, it has high operating efficiency.

As can be understood from the above, the polygon mirror 4 and the high-speed spindle motor 5 are the only rotating components of the boring apparatus. The polygon mirror 4, whose main elements are exclusively the reflective surfaces, is simple in structure and can therefore be machined by a comparatively simple process. The perforating speed can be increased merely by driving the spindle motor 5 faster.

Since segment-beam spots are moved in the same direction and at the same speed as the web sheet, they remain stationary relative to the web sheet. This makes it possible to form perforations in the sheet, which are truly circular and which are substantially uniform in size. In addition, since less energy is required to make a circular hole in the web sheet than to form an elongated hole having a minor axis equal to the diameter of the circular hole, the boring apparatus of this invention is energy-efficient.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:
1. A boring apparatus which comprises:
   a laser beam source for generating a continuous laser beam;

a first converging lens for converging the laser beam generated by said laser beam source;

deflection means for deflecting the laser beam converged by said first converging lens;

beam splitting/reflecting means for splitting the laser beam deflected by said deflection means, into segment beams and reflecting the segment beams;

a converging-lens system for converging the segment beams applied from said beam splitting/reflecting means, on the surface of a web sheet; and an f$\theta$ lens located between said deflecting means and said beam splitting/reflecting means, for converging the segment beams and applying the converted segment beams at a constant speed to a limited surface region of the web sheet, the segment beams forming converged beam spots on the web sheet and the size and shape of the beam spots being maintained by said f$\theta$ lens.

2. The apparatus according to claim 1, wherein said deflection means includes a rotary polygon mirror for deflecting the continuous laser beam.

3. The apparatus according to claim 1, wherein said beam splitting/reflecting means includes mirrors for splitting the continuous laser beam.

4. The apparatus according to claim 1, further comprising second and third beam splitting/reflecting means located between said beam splitting/reflecting means and said converging-lens system, for receiving segment beams applied from said beam splitting/reflecting means and splitting the segment beams, each into sub-segment beams.

5. The apparatus according to claim 4, wherein said converging-lens system includes first, second, third, and fourth focusing lenses for focusing the segment beams on the surface of the web sheet.

6. The apparatus according to claim 5, further comprising means for transporting the web sheet at a constant speed in a manner such that the sheet faces said first, second, third and fourth focusing lenses.

7. A boring apparatus which comprises:

a laser beam source for generating a continuous laser beam;

a first converging lens for converging the laser beam generated by said laser beam source;

deflection means for deflecting the laser beam converged by said first converging lens;

beam splitting/reflecting means for splitting the laser beam deflected by said deflection means, into segment beams and reflecting the segment beams;

a converging-lens system for converging the segment beams applied from said beam splitting/reflecting means, on the surface of a web sheet;

a second converging lens located between said deflecting means and said beam splitting/reflecting means, for converging the segment beams and applying the converted segment beams at a constant speed to a limited surface region of the web sheet; and second and third beam splitting/reflecting means located between said beam splitting/reflecting means and said converging-lens system, for receiving segment beams applied from said beam splitting/reflecting means and splitting the segment beams, each into sub-segment beams.

8. The apparatus according to claim 7, wherein said deflection means includes a rotary polygon mirror for deflecting the continuous laser beam.

9. The apparatus according to claim 7, wherein said beam splitting/reflecting means includes mirrors for splitting the continuous laser beam.

10. The apparatus according to claim 7, wherein said converging-lens system includes first, second, third, and fourth focusing lenses for focusing the segment beams on the surface of the web sheet.

11. The apparatus according to claim 10, further comprising means for transporting the web sheet at a constant speed in a manner such that the sheet faces said first, second, third and fourth focusing lenses.

* * * * *